United States Patent
Perry

(10) Patent No.: US 9,350,039 B2
(45) Date of Patent: May 24, 2016

(54) FLOW BATTERY WITH TWO-PHASE STORAGE

(75) Inventor: Michael L. Perry, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/345,719

(22) PCT Filed: Sep. 28, 2011

(86) PCT No.: PCT/US2011/053647
§ 371 (c)(1),
(2), (4) Date: Mar. 19, 2014

(87) PCT Pub. No.: WO2013/048383
PCT Pub. Date: Apr. 4, 2013

(65) Prior Publication Data
US 2014/0227620 A1 Aug. 14, 2014

(51) Int. Cl.
| | | |
|---|---|---|
| *H01M 8/18* | (2006.01) | |
| *H01M 8/06* | (2006.01) | |
| *H01M 8/20* | (2006.01) | |
| *H01M 8/22* | (2006.01) | |
| *H01M 8/04* | (2016.01) | |

(52) U.S. Cl.
CPC .......... *H01M 8/188* (2013.01); *H01M 8/04067* (2013.01); *H01M 8/06* (2013.01); *H01M 8/0687* (2013.01); *H01M 8/20* (2013.01); *H01M 8/225* (2013.01); *Y02E 60/528* (2013.01)

(58) Field of Classification Search
CPC . H01M 8/04067; H01M 8/06; H01M 8/0687; H01M 8/188; H01M 8/20; H01M 8/225; Y02E 60/528
See application file for complete search history.

(56) References Cited

U.S. PATENT DOCUMENTS

| | | | |
|---|---|---|---|
| 4,180,623 A | 12/1979 | Adams | |
| 5,318,865 A | 6/1994 | Kaneko et al. | |
| 2004/0126642 A1* | 7/2004 | Smedley et al. | 429/34 |
| 2004/0191623 A1 | 9/2004 | Kubata et al. | |
| 2004/0256247 A1* | 12/2004 | Carson et al. | 205/688 |
| 2006/0138996 A1 | 6/2006 | Graham et al. | |
| 2009/0311567 A1 | 12/2009 | Visco et al. | |

(Continued)

FOREIGN PATENT DOCUMENTS

| | | |
|---|---|---|
| EP | 0517217 | 12/1992 |
| GB | 2010574 | 6/1979 |

(Continued)

OTHER PUBLICATIONS

International Search report for PCT Application No. PCT/US2011/053647 completed Dec. 30, 2011.

(Continued)

*Primary Examiner* — Carlos Barcena
(74) *Attorney, Agent, or Firm* — Carlson, Gaskey & Olds, P.C.

(57) ABSTRACT

A flow battery includes at least one cell that has a first electrode, a second electrode spaced apart from the first electrode, and an electrolyte separator layer arranged between the first electrode and the second electrode. A reactant material is stored within a storage portion and selectively delivered to the at last one cell. At least one reactant material is present in a solid phase in the storage portion and is present in a liquid phase in the at least one cell.

6 Claims, 2 Drawing Sheets

(56) References Cited

U.S. PATENT DOCUMENTS

| | | | |
|---|---|---|---|
| 2010/0323264 A1* | 12/2010 | Chiang et al. | 429/449 |
| 2011/0189520 A1* | 8/2011 | Carter et al. | 429/107 |
| 2011/0223450 A1 | 9/2011 | Horne et al. | |
| 2012/0052347 A1* | 3/2012 | Wilson et al. | 429/72 |

FOREIGN PATENT DOCUMENTS

| | | | |
|---|---|---|---|
| JP | 04-223049 | 8/1992 | |
| JP | 2009-283425 | 12/2009 | |
| WO | WO 2004071967 A1 * | 8/2004 | C02F 1/461 |

OTHER PUBLICATIONS

International Preliminary Report on Patentability for PCT Application No. PCT/US2011/05367 received Apr. 28, 2014.

European Search Report for European Search Report for EP11872918 completed Feb. 20, 2015.

* cited by examiner

FLOW BATTERY WITH TWO-PHASE STORAGE

BACKGROUND

This disclosure relates to flow batteries for selectively storing chemical energy and discharging electric energy.

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A basic flow battery includes a redox flow cell having a negative electrode and a positive electrode separated by an electrolyte separator layer, such as an ion-exchange membrane. A negative electrolyte is delivered to the negative electrode and a positive electrolyte is delivered to the positive electrode to drive electrochemically reversible redox reactions. Upon charging, the electrical energy supplied to the electrodes from an external source causes a chemical reduction reaction in one electrolyte and an oxidation reaction in the other electrolyte. The electrolyte separator layer prevents the electrolytes from mixing but permits selected ions to pass through to complete the redox reactions. Upon discharge, the chemical energy contained in the electrolyte is released in the reverse reactions and electrical energy is drawn from the electrodes and delivered to an external load.

SUMMARY

Disclosed is a flow battery that includes at least one cell that has a first electrode, a second electrode spaced apart from the first electrode, and an electrolyte separator layer arranged between the first electrode and the second electrode. A reactant material is stored within a storage portion and selectively delivered to at least one electrode in at least one cell. At least one reactant material is present in a solid phase in the storage portion and is present in a liquid phase in the at least one cell.

A method for a flow battery includes storing the reactant material in a solid phase in the storage portion, converting the solid phase to a liquid phase, and delivering the liquid phase to the at least one cell.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
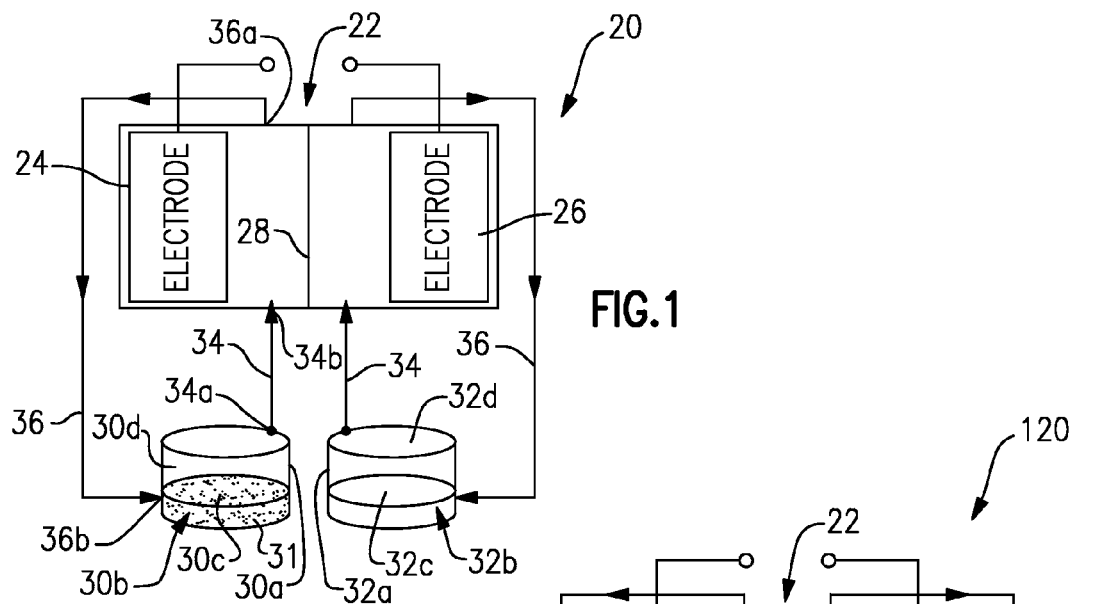
FIG. 1 illustrates an example flow battery that includes a reactant material that is stored in a solid phase and used in a liquid phase.

FIG. 1 schematically illustrates selected portions of an example flow battery 20 for selectively storing chemical energy and discharging electrical energy. As an example, the flow battery 20 is used to convert electrical energy generated in a renewable energy system to chemical energy that is stored until a later time at which there is demand for the electrical energy. The flow battery 20 then converts the chemical energy into electrical energy for supply to an electric grid, for example.

In the illustrated example, the flow battery 20 includes at least one cell 22 for carrying out electrochemically reversible redox reactions to generate electricity or store electrical energy as chemical energy. The at least one cell 22 can include one or more cells 22 in a stacked arrangement. Each cell 22 includes a first electrode 24, a second electrode 26 that is spaced apart from the first electrode 24, and an electrolyte separator layer 28 arranged between the first electrode 24 and the second electrode 26. The flow battery 20 can also include other components that are not specifically shown in the example, such as flow fields for distributing reactant materials, pumps for moving the reactant materials, valves, pressure and temperature transducers, and the like.

In one example, the electrolyte separator layer 28 is a polymer or proton exchange membrane. However, it is to be understood that the electrolyte separator layer 28 is not limited to any particular kind of electrolyte material, and that the illustrated examples can utilize other types of electrolyte separator layers or materials.

The flow battery 20 also includes a first storage portion 30a for storing a first reactant material 30b (e.g., an anolyte) and a second storage portion 32a for storing a second reactant material 32b (e.g., a catholyte). In embodiments, the reactant materials 30b and 32b are aqueous solutions that include one or more electrochemically active elements, such as vanadium, bromine, iron, chromium, zinc, cerium, lead or combinations thereof.

As shown, the storage portions 30a and 32a are substantially equivalent cylindrical storage tanks; however, the storage portions 30a and 32a can alternatively have other shapes and sizes.

The reactant material 30b is delivered (e.g., pumped) to the cell 22 through a feed line 34 and is returned from the cell 22 to the storage portions 30a through a return line 36. The feed line 34 extends between an inlet 34a at the storage portion 30a and an outlet 34b at the cell 22. The return line 36 extends between an inlet 36a at the cell 22 and an outlet 36b at the storage portion 30a. The storage portion 32b is similarly arranged with a feed line 34 and return line 36.

The size of a flow battery is generally dominated by the size of its storage tanks. The disclosed flow battery 20 provides the ability to reduce storage tank size and thereby increase energy density of the system. To reduce the required storage size in the flow battery 20, the electrochemically active elements of the reactant material 30b that are dissolved in a liquid phase 30d are stored, at least in part, as a solid phase 30c. The solid phase 30c is denser than the liquid phase 30d and therefore requires less storage volume. The solid phase may be in the form of a hydrated salt.

The electrochemically active elements have a solubility limit within the liquid solutions. The concentration of electrochemically active elements exceeds the solubility limit for the given conditions of the flow battery 20, which results in precipitation of the solid phases 30c and 32c as hydrated salts in the storage portions 30a and 32a. In some examples, the hydrated salts are sulfate or chloride salts, but the composition of the salts depends on the compositions of the selected electrochemically active elements. Thus, portions of the reactant materials 30b and 32b can be stored as solids, rather than liquids, which reduce the required size of the storage portions 30a and 32a.

The solid phase 30c is not used or electrochemically active in the electrochemical reaction in the cell 22, and thus the electrochemically active elements of the reactant material 30b are dynamically converted between the solid phase 30c and the dissolved liquid phase 30d for use in the electrochemical reaction in the cell 22. In that regard, the reactant material 30b is also present in the liquid phase 30d within the storage portion 30a. As shown, the solid phase 30c generally settles toward the bottom of the storage portion 30a, while the liquid phase 30d floats near the top of the storage portion 30a. The storage portion 32b is similarly arranged with a solid phase 32c and liquid phase 32d, although it is conceivable that one of the storage portions 30a or 32a does not store its respective reactant material 30b or 32b as a solid. For example, one of the electrodes could utilize other known battery reactants, such as: a gas phase reactant (e.g., air, in the case of a redox-air battery) or a solid state reactant (e.g., lithium) or a reactant that is converted between a solid and a dissolved species within the electrode (e.g., zinc metal and zinc cations).

In this example, the inlet 34a of the feed line 34 is located near the top portion of the storage portion 30a in order to draw the liquid phase 30d from the storage portions 30a. In one example, the inlet 34a is at the top 25% of the height of the storage portion 30a. The outlet 36b of the return line 36 is located at or near the bottom of the storage portion 30a. In one example, the outlet 36b is at the bottom 15% of the height of the storage portion 30a. Thus, the inlet 34a of the feed line 34 is vertically above the outlet 36b of the return line 36. The position of the outlet 36b of the return line 36 near the bottom of the storage portion 30a also causes the liquid phase 30d to flow upwards through the solid phase 30c to form a solid-liquid mixture, or fluidized bed 31, in the lower part of the storage portion 30a. The feed line 34 and return line 36 are likewise arranged with regard to the second storage portion 32a. The given example assumes that separated liquid phase 30d is located near the top of the storage portion 30a and separated solid phase 30c near the bottom. However, it is to be understood that the inlet 34a of the feed line 34 is located to draw the liquid phase 30d, wherever substantially separated liquid phase 30d is located, and the outlet 36b of the return line 36 is located to feed the returning liquid phase 30d to wherever substantially separated solid phase 30c is located. Thus, if the liquid phase 30d were denser than the solid phase 30c, the inlet 34a of the feed line 34 would be vertically below the outlet 36b of the return line 36.

The cell 22 generates heat during operation that heats and maintains the electrochemically active elements in the reactant materials 30b and 32b in the liquid phases 30d and 32d. However, upon circulation through the cell 22, where the oxidation state of the electrochemically active element is changed, and circulation back into the respective storage portions 30a and 32a through the return lines 36, the liquid phases 30d and 32d cool and precipitate as the solid phases 30c and 32c.

In one example based on vanadium, the electrochemically active species are $V^{2+}$ and $V^{3+}$. The liquid phase 30d with an initial concentration of $V^{2+}$ is delivered to the cell 22 where the oxidation state of the $V^{2+}$ is changed in the electrochemical reaction to $V^{3+}$, which is dissolved in the solution. The liquid phase 30d with a high concentration of $V^{3+}$ is then returned to the storage portion 30a. Upon return from the cell 22, the liquid phase 30d cools and precipitates the solid phase 30c in the form of a hydrated salt that settles near the bottom of the storage portion 30a. The concentration of $V^{2+}$ and $V^{3+}$ in the liquid phase 30d in the storage portion 30a also shifts according to the solubility limits and equilibrium of each oxidation state with the solid phase 30c. Thus, the liquid phase 30d is dynamically replenished with $V^{2+}$ or $V^{3+}$, which have different solubility limits in the solution. Other ion pairs, such as $V^{4+}$ or $V^{5+}$, or ion pairs of bromine, iron, chromium, zinc, cerium, or lead similarly shift between the liquid and solid phases.

Figure 2:
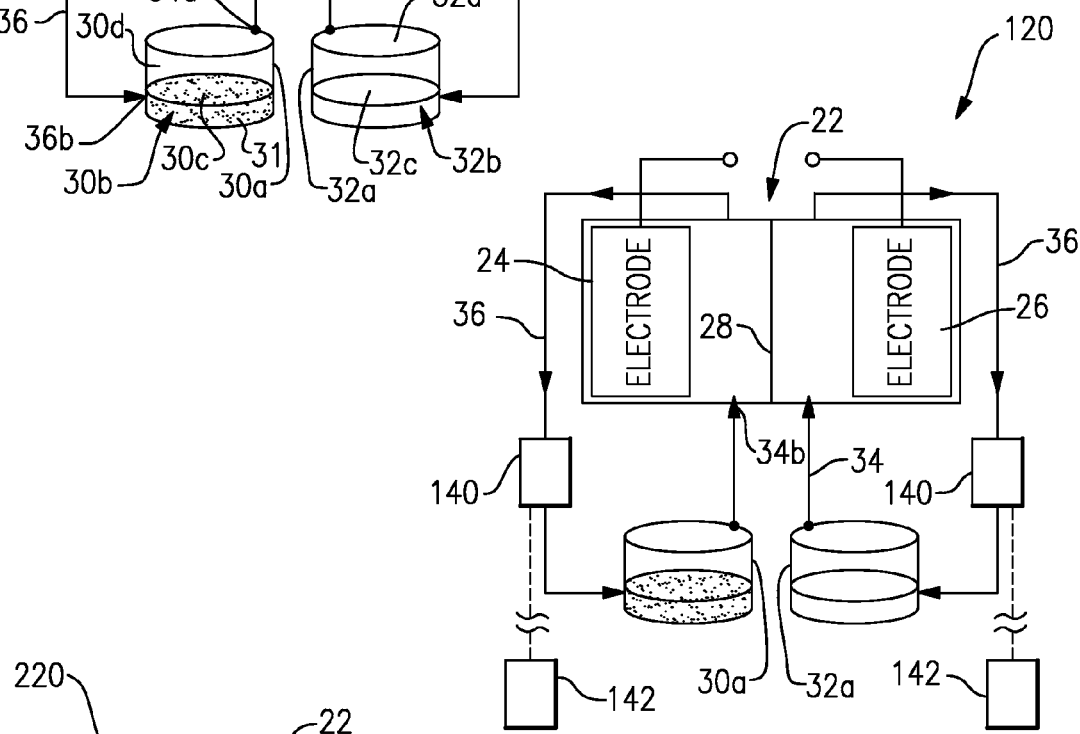
FIG. 2 illustrates another embodiment flow battery that includes a heat exchanger to control the temperature of the reactant material.

FIG. 2 illustrates another embodiment flow battery 120. In this disclosure, like reference numerals designate like elements where appropriate and reference numerals with the addition of one-hundred or multiples thereof designate modified elements that are understood to incorporate the same features and benefits of the corresponding elements. In this example, the flow battery 120 additionally includes a heat exchanger 140 through which the return line 36 extends. The heat exchanger 140 is used to actively cool the reactant material 30b returning from the cell 22 to the storage portion 30a. By cooling the reactant material 30b, the solid phase 30c more readily precipitates from the liquid phase 30d for storage in the storage portions 30a. Likewise, the return line 36 for the second storage portion 32a extends through a heat exchanger 140.

In a further example, the heat exchanger 140 is in communication with a controller 142 to selectively control the temperature of the reactant materials 30b and 32b, and thus, the amount solid phases 30c and 32c that are precipitated. As an example, the controller 142 controls the temperature of the reactant materials 30b and 32b to maintain a desired ratio of the liquid phases 30d and 32d to the associated solid phases 30c and 32c within the storage portions 30a and 32a.

Figure 3:
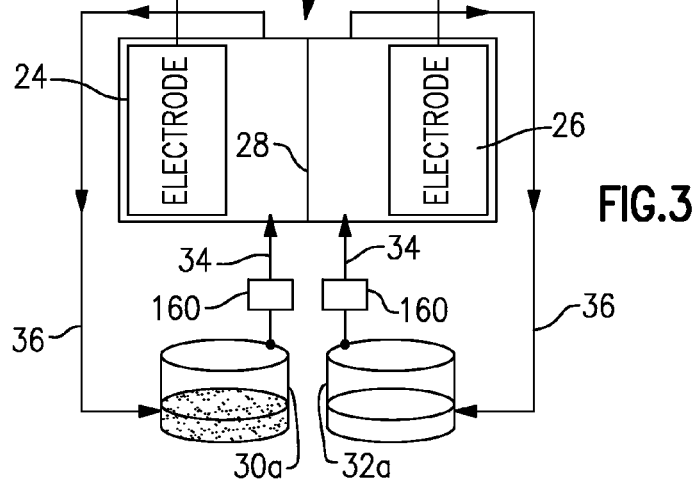
FIG. 3 illustrates another embodiment flow battery that includes a filter to remove solid phase reactant material from liquid phase reactant material prior to delivery to a cell.

FIG. 3 illustrates another embodiment flow battery 220 that is similar to the flow battery 20 shown in FIG. 1, but includes separation devices 160 located in the feed lines 34 between the storage portions 30a and 32a, and the cell 22. The separation devices 160, such as filters, serve to remove any of the solid phases 30c and 32c from the liquid phase 30d and 32d before delivery into the cell 22. The removed solid phases 30c and 32c can be returned to the storage portions 30a and 32a.

Figure 4:
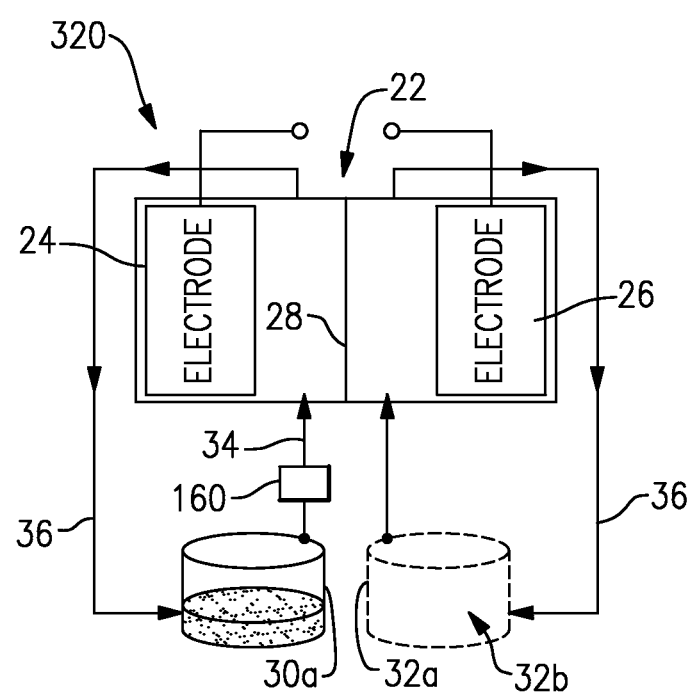
FIG. 4 illustrates another embodiment flow battery that includes different reactants for each electrode.

FIG. 4 illustrates another embodiment flow battery 320 that is similar to the flow battery 220 shown in FIG. 3. In this example, the optional storage portion 32a is shown in dashed lines and does not store its respective reactant material 32b as a solid. For example, the second electrode 26 utilizes other known battery reactants, such as a gas phase reactant (e.g., hydrogen, in the case of a redox-hydrogen battery with a hydrogen-storage tank), a solid state reactant (e.g., lithium) or a reactant that is converted between a solid and a dissolved species within the electrode (e.g., zinc metal and zinc cations). In that regard, the storage portion 32a is suitably sized and shaped depending on the type of reactant material used. Alternatively, there is no storage portion 32a or tank and the reactant for the second electrode 26 is simply circulated through the second electrode 26 (e.g., the storage portion 32a is excluded and the return line 36 connects directly to feed line 34); an example of this case would be air, in the case of a redox-air battery.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow battery comprising:
   at least one cell including a first electrode, a second electrode spaced apart from the first electrode, and an electrolyte separator layer arranged between the first electrode and the second electrode;
   at least one storage portion fluidly connected with the at least one cell;
   a first reactant material stored within a first storage tank of the at least one storage portion and selectively delivered to the first electrode of the at least one cell, and the first reactant material is present in a solid phase the least one storage portion and is present in a liquid phase in the at least one cell;
   a second, different reactant material that is circulated through the second electrode with no storage tank;
   a feed line having an inlet at the at least one storage portion and an outlet at the at least one cell;
   a return line having an inlet at the at least one cell and an outlet at the at least one storage portion; and
   a heat exchanger through which the return extends, the heat exchanger operable to control temperature of the reactant material responsive to an amount of the solid phase, wherein the at least one storage portion, with regard to number of storage portions, consists of the first storage tank.

2. The flow battery as recited in claim 1, wherein the first reactant material is an aqueous solution.

3. The flow battery as recited in claim 2, wherein the aqueous solution includes an electrochemically active element selected from a group consisting of vanadium, bromine, iron, chromium, zinc, cerium, lead and combinations thereof.

4. The flow battery as recited in claim 3, wherein the electrochemically active element includes vanadium species in both electrodes.

5. The flow battery as recited in claim 1, wherein the inlet of the feed line is at a top portion of the first storage tank and the outlet of the return line is at a bottom portion of the first storage tank.

6. The flow battery as recited in claim 1, further comprising a filter in the feed line.

* * * * *